United States Patent [19]

Ware

[11] Patent Number: 4,860,640
[45] Date of Patent: Aug. 29, 1989

[54] AIR OPERATED DIAPHRAGM SPRING BRAKE

[75] Inventor: Nathan C. Ware, North Muskegon, Mich.

[73] Assignee: Neway Corp., Muskegon, Mich.

[21] Appl. No.: 937,371

[22] Filed: Dec. 3, 1986

[51] Int. Cl.[4] .............................................. F01B 7/00
[52] U.S. Cl. .......................................... 92/63; 92/64; 92/94; 92/167
[58] Field of Search ...................... 92/63, 64, 100, 101, 92/167, 48, 98 R, 94, 99

[56] References Cited

U.S. PATENT DOCUMENTS

| | | | |
|---|---|---|---|
| 2,258,784 | 10/1941 | McNeal | 188/153 R |
| 2,641,283 | 6/1953 | Houston | 92/99 |
| 2,675,758 | 4/1954 | Hughes | 92/98 R |
| 2,744,543 | 5/1956 | Brady | 92/98 R |
| 3,101,219 | 8/1963 | Herrera | 92/48 |
| 3,127,818 | 4/1964 | Cruse | 92/53 |
| 3,175,473 | 3/1965 | Boteler et al. | 92/100 |
| 3,244,079 | 4/1966 | Herrera | 92/63 |
| 3,334,545 | 8/1967 | Houser | 92/99 |
| 3,416,461 | 12/1968 | McFarland | 92/98 R |
| 3,424,064 | 1/1969 | Valentine | 92/101 |
| 3,599,760 | 8/1971 | Moss | 188/170 |
| 3,696,711 | 10/1972 | Berg et al. | 92/48 |
| 3,712,178 | 1/1973 | Hensley | 91/170 R |
| 3,911,796 | 10/1975 | Hull et al. | 92/101 |
| 3,926,094 | 12/1975 | Kurich et al. | 92/63 |
| 4,043,251 | 8/1977 | Ohmi | 91/376 R |
| 4,086,036 | 4/1978 | Hagen et al. | 417/413 |
| 4,353,291 | 10/1982 | Hauduc | 92/99 |
| 4,508,118 | 4/1985 | Toth | 92/101 |

FOREIGN PATENT DOCUMENTS 2088525 6/1982 United Kingdom .................. 92/99

Primary Examiner—Robert E. Garrett
Assistant Examiner—Thomas Denion
Attorney, Agent, or Firm—Varnum, Riddering, Schmidt & Howlett

[57] ABSTRACT

An air-operated spring brake of the type wherein a spring-operated brake actuator is in tandem with an air-operated service brake actuator has a spring diaphragm which separates a spring housing into a fluid pressure chamber and a spring chamber. A spring in the spring chamber bears against a pressure plate to bias the diaphragm longitudinally in the spring housing in a brake-applying direction upon a decrease in pressure in the fluid pressure chamber. The diaphragm is movable generally longitudinally in the other direction to compress the spring in the presence of pressure in the fluid chamber to allow operation of the service brake actuator independently of the spring-operated actuator. A push plate, mounted to a push member, moves reciprocally with the diaphragm in the fluid pressure chamber in abutting relationship to the spring diaphragm. A boss on one side of the spring diaphragm fits snugly within an opening in the spring pressure plate to prevent lateral shifting of the spring diaphragm with respect to the pressure plate when the two are in contact with one another. Alternatively, or in addition, a ring on the pressure plate side of the spring diaphragm abuts a peripheral surface of the spring pressure plate to prevent lateral shifting of the spring diaphragm with respect to the pressure plate when the two are in contact with one another. A second ring on the other side of the diaphragm abuts a peripheral surface of the push plate to prevent lateral shifting of the diaphragm with respect to the push plate when the two are in engagement with one another.

17 Claims, 1 Drawing Sheet

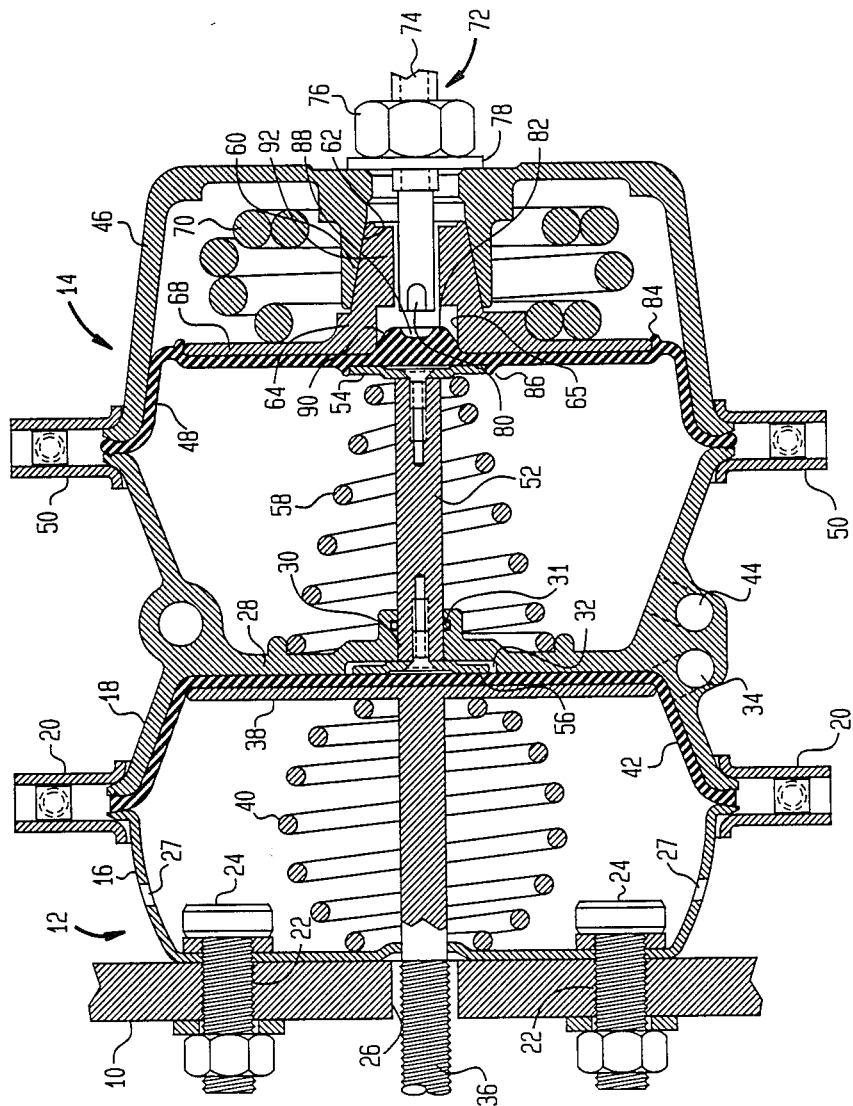

AIR OPERATED DIAPHRAGM SPRING BRAKE

BACKGROUND OF THE INVENTION

1. Field of the Invention

This invention relates to air-operated diaphragm spring brakes of the type used with air brake systems on vehicles such as trucks. In one of the aspects, the invention relates to an air-operated diaphragm spring brake wherein the spring-operated portion of the brake is prevented from operating off-center due to external forces biasing the pressure plate.

2. State of the Prior Art

Spring brake-applying actuators are in common use with air brake systems used on trucks, buses and towed vehicles. Such actuators normally include a service brake actuator for applying and releasing the brakes in response to delivery and exhaust of compressed air and a spring actuator disposed in tandem with the service brake actuator. The spring actuator uses spring force to operate the service brake actuator and apply brakes when the air in a spring actuator chamber is reduced below some predetermined level. Air may be reduced in the spring actuator to apply the brakes under the control of the operator or automatically as a result of failure of portions of the service brake air system.

In all such actuators, a barrel-shaped spring is used to store energy and to exert the large force required for braking in the event of air pressure failure. Air pressure acting on a movable wall is employed to compress the spring and maintain it in its brake release position. When the air is exhausted, the spring acts on the movable wall, typically a diaphragm or a piston, and through an actuating rod to exert the spring force on the service actuator to apply the brakes.

In service of the diaphragm brakes, the diaphragm can become misaligned with the springs, sometimes causing a binding of a spring-mounted pressure plate on the housing. In addition, misalignment may cause wear between the spring brake actuator and the guide therefor. This wear may cause leakage of pressure from the service brake actuator and spring brake actuator chambers.

It is thought that the misalignment is due to improper seating of the adaptor push rod on the diaphragm during compression and expansion of the spring brake spring. In the to Kurichh et al U.S. Pat. No. 3,926,094, issued Dec. 16, 1975, any lateral thrust of the spring is compensating by providing a pivotable joint between the spring actuating rod and the guide therefor, and also a pivotable joint between the actuating rod and the actuating rod plate which is in contact with the spring diaphragm. These features accommodate the lateral thrust of the spring to prevent wear between the spring actuating rod and the guide therefor. However, these features do not necessarily prevent dragging of the spring pressure plate on the housing. This problem is due to lateral shifting of the diaphragm with respect to the spring pressure plate. Lateral shifting of the diaphragm may be due to a whole host of problems including installation and brake adjustment problems.

SUMMARY OF THE INVENTION

According to the invention, an interengaging means is provided between one side of an imperforate spring diaphragm and the spring pressure plate to prevent lateral shifting of the spring diaphragm with respect to the spring pressure plate when the two are in contact with one another. The interengaging means are formed between lateral abutting portions of the one side of the spring plate and the imperforate diaphragm. In this manner, misalignment of the spring pressure plate and the spring diaphragm is avoided. In a preferred embodiment of the invention, the interengaging means comprises an opening in the pressure plate and a boss on one side of the spring diaphragm in registry with the pressure plate opening. Typically, the spring pressure plates will have a central opening and the incorporation of a boss sized to fit within the opening is an inexpensive, yet very effective way, to solve the misalignment problem.

Typically, the spring pressure plate opening is in a central portion thereof and the boss is in a central portion of the diaphragm. The boss is sized to fit snugly within the pressure plate opening and preferably has sloping surfaces to guide the boss into the pressure plate opening.

In addition to, or in lieu of, the boss, the interengaging means can comprise an annular ring on the surface of the diaphragm which is shaped to conform with an outer peripheral surface of the spring pressure plate. Typically, the spring pressure plate is circular and the ring on the diaphragm is likewise circular to conform with the outer circumference of the spring pressure plate.

The boss and/or the circular ring can be integrally molded with the spring diaphragm. Alternatively, although less preferably, the boss and/or the ring can be formed separately and adhesively secured to the diaphragm.

In a more preferred embodiment of the invention, a second interengaging means is provided on a second side of the spring diaphragm at a push plate to prevent lateral shifting of the push plate with respect to the second diaphragm. The push plate is typically secured to the auxiliary or spring push rod which drives the service push rod when the spring brake is operated. The second interengaging means preferably comprises a ring on the second side of the diaphragm in registry with a peripheral edge of the push plate.

The invention is used in an air-operated spring brake actuator in which a spring-operated brake actuator is in tandem with an air-operated service brake actuator of the type wherein a first or service diaphragm is movable in the presence of air pressure to actuate brakes on the vehicle in accordance with the operator's movement of a foot pedal. The spring-operated actuator has a spring housing with a wall dividing the service brake actuator and the spring-operated brake actuator. A second or spring diaphragm in the spring housing divides the spring housing into a spring chamber and a fluid pressure chamber. A pressure plate in the spring chamber abuts the second or spring diaphragm to move the spring diaphragm longitudinally of the housing in a brake-applying direction through the pressure plate upon a decrease in pressure in the fluid pressure chamber. The second or spring diaphragm is movable generally longitudinally in the other direction to compress the spring in the presence of pressure in the fluid pressure chamber to allow operation of the service brake actuator independently of the spring-operated actuator. A push plate in the fluid pressure chamber abuts the second or spring diaphragm for movement therewith. A push member extends generally longitudinally in the spring housing and has an end portion projecting through the wall of the spring housing to guide the push member reciprocally with respect to the wall. Another end of the push member is secured to the push plate.

BRIEF DESCRIPTION OF THE DRAWING

The invention will now be described with reference to the accompanying drawing which shows a cross-sectional view of an air-operated diaphragm spring brake according to the invention.

DETAILED DESCRIPTION OF THE DRAWING

Referring now to the drawing, there is shown an air-operated diaphragm spring brake of the type disclosed in the Kurichh et al U.S. Pat. No. 3,926,094 and commonly referred to an air-operated spring brake. The brake is attached to a wall 10 of the vehicle and is adapted to operate a braking system through a push rod 36 which extends through the wall 10 of the vehicle.

The air-operated spring brake comprises a service chamber 12 and a spring chamber 14 joined together in tandem. The service chamber 12 comprises a cup-shaped service housing 16 and a double cup-shaped service/spring housing 18 joined together through a clamp 20 and forming a hollow interior chamber. Openings 22 are provided in the service housing 16 for bolts 24 which bolt the service housing 16 to the wall 10. A central opening 26 and side openings 27 are also provided in the service housing 16.

The service/spring housing 18 forms a divider wall 28 and has a central opening 30 with an O-ring 31 positioned therein. An indentation or annular depression 32 is formed around the opening 30. A pressure opening 34 is provided in the housing 18 for providing communication between a source of pressure (not shown) and the interior of the service chamber 12.

A service brake push rod 36 is mounted in the service chamber for reciprocation within the opening 26 and mounts a pressure plate 38 at an inner end thereof. A compression spring 40 extends between a central portion of the service housing 16 and the pressure plate 38 to bias the pressure plate 38 and thus the service brake push rod 36 to the right as viewed in the drawing. A first elastomeric diaphragm 42 (also known as the service brake diaphragm) is mounted within the service chamber 12 and is clamped between the service housing 16 and the service/spring housing 18. The spring-biased pressure plate 38 forces the diaphragm 42 against the divider wall 28 of the service/spring housing 18 as shown in the drawing.

When air pressure is supplied to the pressure opening 34 as, for example, when the brakes are applied by a vehicle operator, air pressure is introduced between the diaphragm 42 and the divider wall 28, thereby forcing the diaphragm 42 toward the central portion of the service housing 16 (to the left as seen in the drawing). In this manner, the push rod 36 is extended to the left as illustrated in the drawing to apply braking pressure to the vehicle brakes in a conventional fashion.

The spring chamber 14 comprises a side of the service-spring housing 18 and a spring housing 46 which is clamped to the service/spring housing 18 through a clamp 50.

An opening 44 is provided within the service/spring housing to connect the interior of the spring chamber 14 with a source of pressure (not shown). A second elastomeric diaphragm 48 (known as the spring diaphragm) is clamped between the service/spring housing 18 and the spring housing 46. An adaptor push rod 52 is mounted within the spring chamber 14 and has a reaction plate 54 rigidly bolted to one end and a pressure plate 56 bolted to the other end thereof. The adaptor push rod 52 extends through the opening 30 and in sealing engagement with the O-ring 31. The pressure plate 56 seats within the annular depression 32 of the divider wall 28. A compression spring 58 is mounted within the spring chamber 14 between the divider wall 28 and the reaction plate 54 to bias the adaptor push rod 52 into the position illustrated in the drawing.

The spring housing 46 has in a central portion thereof a cone receptacle 60 which forms a central opening 62. This opening expands in a conical fashion from the entrance end into the interior of the spring chamber 14.

A receptacle plate 64 has a conical portion 66 with an outer surface which complements the central opening 62 of the cone receptacle 60 and further has a pressure plate 68 at an inner portion thereof which bears against the diaphragm 48. A central opening 65 with lands 92 is provide in the center of the receptacle plate 64. A compression spring 70 is positioned between the pressure plate 68 and the spring housing 46 to bias the pressure plate 68 to the left as viewed in the drawing.

A release tool 72 can be provided within the central opening 62 of the cone receptacle 60 for mechanically drawing the receptacle plate 64 back into the position illustrated in the drawing in the event of air pressure failure within the spring chamber 14. To this end, the release tool 72 comprises a threaded rod 74 having a nut 76 threaded on the end thereof and a washer 78 which bears against the outer surface of the spring housing 46. Projections 80 on the end of the threaded rod 74 are selectively engageable with the lands 92 of the receptacle plate 60 upon rotation of the threaded rod through 90, so that the threaded rod can engage and draw to the right the pressure plate 68 upon movement of the threaded rod 74 to the right as viewed in the drawing. The position of the threaded rod 74 with respect to the spring housing 46 is controlled by the position of the nut 76 on the rod 74 as the nut 76 bears against the washer 78.

In operation, air pressure is continually supplied to the spring chamber 14 through the opening 44 to maintain the diaphragm 48 essentially in the position illustrated in the drawing. In this position, the push rod normally will be operated as described above by selective pressurization of air into the service chamber through the opening 34. However, in the event of failure of the air pressure system, the pressure in the spring chamber will be decreased so that the springs 40 and 58 would no longer be able to overcome the pressure of the much larger and stronger compression spring 70. Thus, the pressure plate 68 forces the diaphragm 48, and thus the adaptor push rod 52 to the left, thereby also forcing the push rod 36 to the left to apply the braking pressure to the brakes. The reciprocatory movement of the pressure plate 68 with respect to the cone receptacle 60 is guided by the complementary conical surfaces of the central opening 62 and the outer surface of the conical portion 66. Typically, diaphragm 48 is axially separable from pressure plate 68, but is kept in contact therewith by air pressure and by the reaction plate 54.

The air-operated spring brake described above is a well-known type of air-operated spring brake which has been sold for many years by the Anchorlok of Compton, Calif.

It has been found, however, that the diaphragm 48 tends to work itself to one side or the other of the reaction plate 54 and/or the pressure plate 68, thereby producing a lateral force on pressure plate 68. Occasionally, the conical portion 66 may stick or drag the cone receptacle 60 and thereby not allow full compression of spring 70. Alternatively, the adaptor push rod 52 may have a lateral force applied thereto by the pressure plate 38 and thereby cause some degree of binding of the push rod 52 within the opening 30 of the service/spring housing 18.

Applicant has discovered that this potential problem can be solved more economically and perhaps more effectively by molding into the diaphragm 48 bosses, rings and the like to provide a positive interengagement between the diaphragm 48 and the pressure plate 68 and/or between the diaphragm 48 and the reaction plate 54. Thus, applicant provides a conical boss 82 having a sloping outer surface 90 which may have a central indentation or dimple 88. The outer surface 90 can be rounded or square for smaller diameters. The boss 82 is shaped to fit within the central opening 65 of the receptacle plate 64 to prevent lateral shifting of the diaphragm 48. The conical surface 90 provides a means for guiding the boss 82 into the central opening 65. Thus, with the boss 82 the precise lateral relationship between the diaphragm 48 and the pressure plate 68 is always maintained.

In lieu of, or in addition to, the boss 82, an annular rib 84 can be formed on the diaphragm for lateral engagement with the peripheral edge of pressure plate 68. The annular rib 84 is shaped to have an inner diameter which approximates the circumferential diameter of the pressure plate 68. Thus, the annular rib 84 will maintain a precise lateral relationship between the pressure plate 68 and the diaphragm 48, even in the absence of pressure within the spring chamber 14.

In addition to the boss 82 or the annular rib 84, an annular rib 86 can be provided on the air pressure side of the diaphragm 48 for engagement with the peripheral edge of the reaction plate 54. The inner diameter of the annular rib 86 approximates the circumferential diameter of the reaction plate 54 for positive lateral engagement between the reaction plate 54 and the annular rib 86. The compression spring 58 maintains the reaction plate 54 in axial contact with the diaphragm 48. Thus, the diaphragm 48 cannot slip to one side or the other with respect to the reaction plate 54 because it will be restricted by the annular rib 86.

The boss 82 and the annular ribs 84 and 86 are preferably integrally molded with the diaphragm 48. This molding process is no more expensive than the molding of an ordinary diaphragm 48 except for some very minor incremental material costs. Alternatively, although less desirable, the boss 82, the ribs 84 and 86 could be manufactured separately and adhered onto a conventional diaphragm 48.

It is important to note that if the diaphragm 48 centers the pressure plate 68 and keeps it centered, it will prevent the tipping of the pressure plate 68 which tipping results in the coil spring 70 collapsing more on one side than the other. This unbalanced spring collapsing can cause premature spring failure, loss of spring force, and premature diaphragm failure.

It is thus seen that the invention provides a very economical, yet very effective, method of preventing misalignment of the diaphragm 48 with respect to the pressure plate 68 and/or the reaction plate 54. The potential problem of sticking of the pressure plate or sideways cocking of the spring is thus effectively solved in a very economical manner.

Reasonable variation and modification are possible within the scope of the foregoing disclosure and drawing without departing from the spirit of the invention.

The embodiments of the invention in which an exclusive property or privilege is claimed are defined as follows:

1. An air operated spring brake having a spring-operated brake actuator in tandem with an air-operated service brake actuator, the spring-operated actuator having:
   a spring housing with a wall dividing the service brake actuator and the spring brake actuator;
   an imperforate elastomeric diaphragm in said spring housing dividing the latter into a spring chamber and a fluid pressure chamber;
   a pressure plate in said spring chamber in abutting relationship with said diaphragm;
   guide means between said pressure plate and said spring housing for guiding reciprocation of said pressure plate with respect to said spring housing;
   a spring in said spring chamber acting on said pressure plate to move the latter and said diaphragm generally longitudinally of said housing in a brake-applying direction upon a decrease in fluid pressure in said fluid pressure chamber;
   said diaphragm being movable generally longitudinally in the other direction to compress said spring in the presence of pressure in said fluid pressure to allow operation of said service brake actuator independently of said spring-operated actuator;
   a push plate in said fluid pressure chamber abutting said diaphragm for movement therewith;
   a push member extending generally longitudinally of said spring housing and having an end portion projecting through said wall and another end secured to said push plate;
   interengaging means formed by a first side of said imperforate diaphragm and said pressure plate to prevent lateral shifting of said diaphragm with respect to said pressure plate; when the two are in contact with one another;
   said interengaging means preventing lateral shifting between said pressure plate and said spring housing.

2. An air-operated spring brake according to claim 1 wherein said interengaging means comprises an opening in said pressure plate and a boss on one side of said diaphragm in registry with said pressure plate opening.

3. An air-operated spring brake according to claim 2 wherein said pressure plate opening is in a central portion of said pressure plate.

4. An air-operated spring brake according to claim 3 wherein said boss is sized to fit snugly within said pressure plate opening.

5. An air-operated spring brake according to claim 4 wherein said boss has a sloping or rounded surface to guide said boss into said pressure plate opening.

6. An air-operated spring brake according to claim 5 wherein said boss is integrally molded to said diaphragm.

7. An air-operated spring brake according to claim 5 wherein said pressure plate is circular and said interengaging means further comprises an annular ring on said diaphragm concentric with said pressure plate and having an inner diameter slightly larger than the outer diameter of said pressure plate.

8. An air-operated spring brake according to claim 7 wherein said annular ring is integrally molded to said diaphragm.

9. An air-operated spring brake according to claim 7 and further comprising a second interengaging means between a second side of said diaphragm and said push plate to prevent lateral shifting of said push plate with respect to said diaphragm.

10. An air-operated spring brake according to claim 9 wherein said push plate has an outer peripheral edge and said second interengaging means comprises a ring on said second side of said diaphragm in registry with said peripheral edge of said push plate.

11. An air-operated spring brake according to claim 2 wherein said boss has a sloping surface to guide said boss into said pressure plate opening.

12. An air-operated spring brake according to claim 2 wherein said pressure plate has an outer peripheral edge and said interengaging means further comprises an annular ring on said first side of said second diaphragm and shaped to conform with the outer peripheral edge of said pressure plate.

13. An air-operated spring brake according to claim 2 and further comprising a second interengaging means between a second side of said diaphragm and said push plate to prevent lateral shifting of said push plate with respect to said diaphragm.

14. An air-operated spring brake according to claim 2 wherein said boss is integrally molded to said diaphragm.

15. An air-operated spring brake according to claim 1 wherein said pressure plate has an outer peripheral edge and said interengaging means comprises an annular ring in registry with the outer peripheral edge of said pressure plate.

16. An air-operated spring brake according to claim 15 wherein said annular ring is integrally molded to said diaphragm.

17. An air-operated spring brake according to claim 15 and further comprising a second interengaging means between a second side of said diaphragm and said push plate to prevent lateral shifting of said push plate with respect to said diaphragm.

* * * * *

UNITED STATES PATENT AND TRADEMARK OFFICE
CERTIFICATE OF CORRECTION

PATENT NO. : 4,860,640

DATED : August 29, 1989

INVENTOR(S) : NATHAN C. WARE

It is certified that error appears in the above-identified patent and that said Letters Patent is hereby corrected as shown below:

On the title page, item [73], "Neway Corp., Muskegon, Mich." should be --Lear Siegler, Inc., Santa Monica, CA--.

Claim 1, column 6, line 29, after "fluid pressure" insert --chamber--.

Claim 1, column 6, line 41, delete ";".

Signed and Sealed this

Fourteenth Day of May, 1991

Attest:

HARRY F. MANBECK, JR.

Attesting Officer

Commissioner of Patents and Trademarks